Inventors
IAN P. ARTHUR
FRANCIS R. BELL

Dec. 19, 1967  I. P. ARTHUR ETAL  3,359,175
NUCLEAR REACTOR

Filed Sept. 16, 1966  3 Sheets-Sheet 3

Inventors
IAN P. ARTHUR
FRANCIS R. BELL

By
Atty

United States Patent Office 3,359,175
Patented Dec. 19, 1967

3,359,175
NUCLEAR REACTOR
Ian P. Arthur and Francis R. Bell, San Diego, Calif., assignors to the United States of America as represented by the United States Atomic Energy Commission
Filed Sept. 16, 1966, Ser. No. 580,570
1 Claim. (Cl. 176—59)

ABSTRACT OF THE DISCLOSURE

A gas-cooled nuclear reactor having a prestressed concrete reactor vessel in the upper portion of which the reactive core is supported by means comprising a plurality of columns extending between a core supporting floor and the lower floor of the reactor.

---

This invention relates to nuclear power reactors and, more particularly, to an improved nuclear power reactor utilizing a prestressed concrete reactor vessel and using gas as the coolant.

The use of a prestressed concrete reactor vessel for enclosing a nuclear reactor has heretofore been suggested. Among the advantages of this form of reactor construction are its relatively low cost and its non-susceptibility to sudden explosive failure. In addition, the prestressing tendons or strengthening cables in the concrete of the reactor vessel tend to mitigate against fault propagation in the reactor vessel since each tendon is independent of the others. The prestressing tendons may be placed toward the outside of the reactor vessel, with the vessel thereby acting as a shield to prevent radiation embrittlement of the tendons. The prestressed concrete reactor vessel construction has also been found to be well adapted to erection in the field, since less dependence is required on the specialized skills and rigorous inspection associated with those types of reactor vessels requiring extensive welding of thick metal components.

The use of a prestressed concrete reactor vessel which contains the entire primary system including the core, primary coolant circulators, steam generators and associated main primary coolant ducting, has heretofore been suggested. The fact that external main primary coolant ducts are eliminated by enclosing the entire primary system in the reactor vessel avoids the possibility of a sudden loss of coolant. Moreover, elaborate biological shielding, in addition to the reactor vessel, for enclosing the steam generators and main primary coolant ducting becomes unnecessary, since the reactor vessel itself performs this function.

Although possessing the aforementioned advantages, a gas cooled nuclear power reactor utilizing a prestressed concrete reactor vessel enclosing the entire primary system is not without certain problems. Since the steam generating equipment is contained inside the reactor vessel, it may be very difficult to effect repair and replacement of this equipment. To repair or replace parts of the steam generating equipment while it is within the reactor vessel is difficult because of the restricted available space, however, the size and complexity of the equipment has heretofore made it impractical to remove from the reactor vessel. This is because openings in the prestressed concrete reactor vessel which are large enough to facilitate removal of large and complex steam generating equipment have heretofore made it very difficult to construct a reactor vessel of satisfactory integrity. In addition to repair and replacement problems, high temperature operation may cause problems in maintaining structural integrity of the supporting elements for the reactor core.

Accordingly, it is an object of this invention to provide an improved nuclear reactor.

Another object of the invention is to provide an improved gas cooled nuclear reactor wherein the entire primary system is enclosed within a prestressed concrete reactor vessel.

Still another object of the invention is to provide a nuclear reactor of the type described wherein the steam generating equipment may be completely removed and replaced with minimal effect on the integrity of the reactor vessel.

A further object of the invention is to provide a high temperature gas cooled reactor of the type described wherein means are provided for facilitating the cooling of structural elements inside the reactor vessel.

Other objects and the various advantages of the invention will become apparent to those skilled in the art from the following description taken in connection with the accompanying drawings, wherein.

Figure 1:
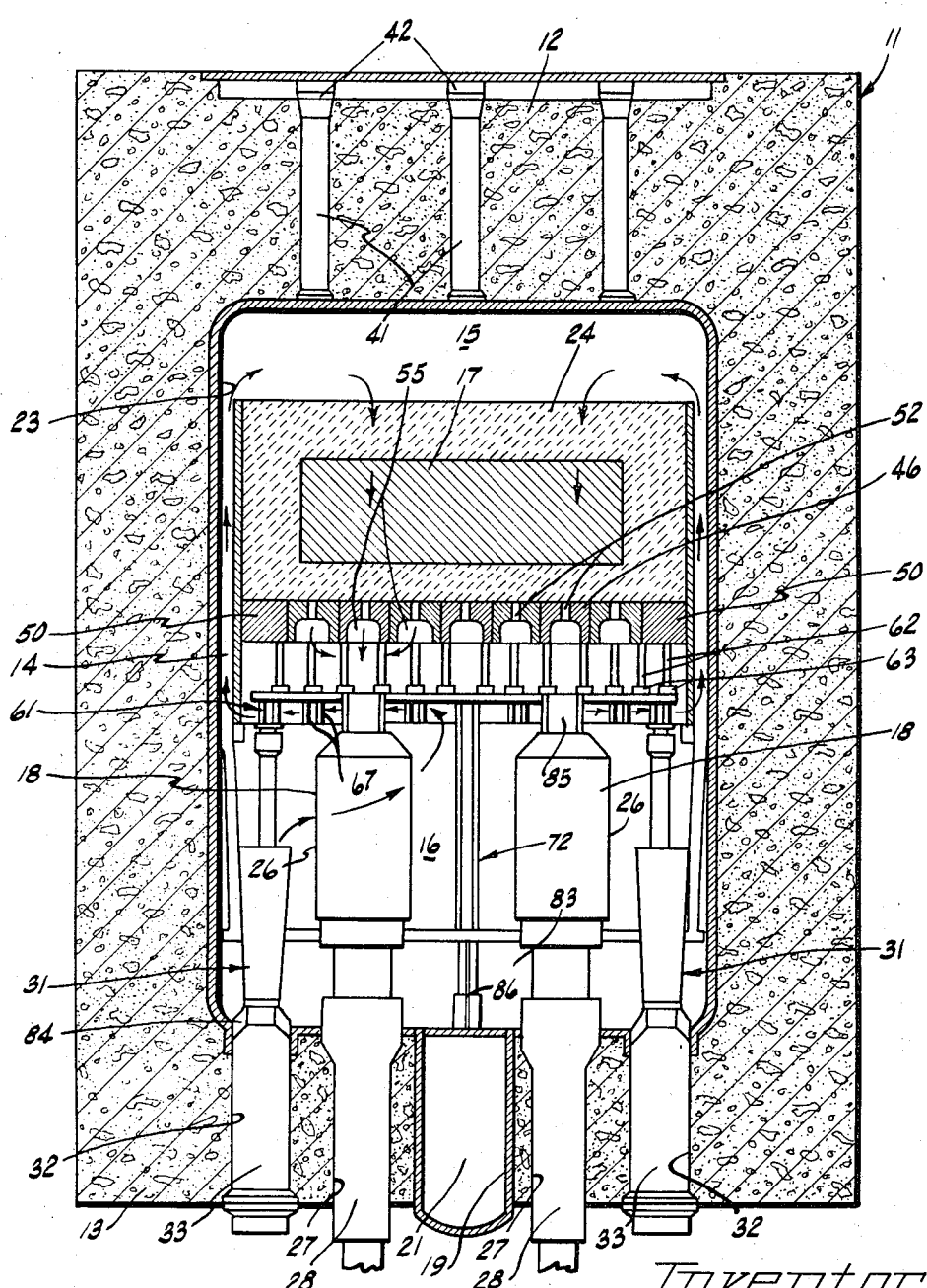
FIGURE 1 is a schematic full section side view of a nuclear reactor constructed in accordance with the invention.

Very generally, the nuclear reactor of the invention comprises an elongated prestressed concrete reactor vessel 11 including upper and lower end walls 12 and 13, respectively. The vessel, together with the end walls, defines an elongated vertically oriented chamber 14 with upper and lower regions 15 and 16, respectively. A reactive core 17 is supported in the upper region, and a plurality of steam generator modules 18 are removably supported in the lower region. Means are provided for circulating coolant gas through the core and through the steam generator modules. The reactor vessel is provided with an access penetration 19 in the lower end wall communicating with the chamber. The access penetration is of sufficient size to permit passage of each of the steam generator modules therethrough. Removable containment means 21 are provided for sealing the access penetration.

Referring now in greater detail to the reactor of the invention, the illustrated prestressed concrete reactor vessel 11 is elongated and of roughly hexagonal exterior cross section. Longitudinal ribs 22 run the length of the reactor vessel on the exterior thereof, and the reactor vessel is supported on a cylindrical base 25, which may be integral therewith. Other external shapes for the reactor vessel are also possible within the scope of the invention. The elongated reactor vessel is disposed vertically in order to accommodate the interior equipment in the manner described subsequently. The reactor vessel includes upper and lower end walls 12 and 13 which provide generally flat exterior surfaces and which, together with the rest of the reactor vessel, define an elongated vertically oriented interior chamber 14. The chamber is referred to herein as having upper and lower regions 15 and 16, respectively. The interior walls of the chamber defined by the prestressed concrete reactor vessel are lined with an alloy steel liner 23 which may be suitably cooled.

As previously mentioned, the reactor vessel 11 is comprised of prestressed concrete, thereby offering certain advantages. Among these advantages is the fact that a prestressed concrete reactor vessel does not fail by sudden explosion, but rather develops excessive leaks first. These leaks relieve the internal pressure until the tendons imbedded in the concrete are able to restore a substantial degree of integrity to the reactor vessel. By enclosing the entire primary system in the reactor vessel, no external main coolant ducts are necessary and thereby the danger of rapid coolant loss is avoided.

The core 17 of the reactor is supported in the upper region 15 and is completely surrounded by a reflector 24. The core may be of any suitable construction, however, a preferred construction for the core is described in detail further on in this specification. The means which support the core in the upper region 15 are also described in detail subsequently and serve to support the core such that it is spaced from the upper end wall 12 and from the side walls of the chamber 14. The core supporting means are of a configuration to provide an annular space surrounding the core, which space is utilized for the passage of gas, described below. The core is of a construction such that a flow of gas through the core may be established in order to withdraw heat for generating steam.

The steam generating equipment is located in the lower region 16 of the interior chamber 14. The steam generator equipment is of modular construction comprising a plurality of steam generator modules 18 arranged adjacent each other in the lower region. Each of the modules is a self-contained steam generator and may include suitable tubing 29 (FIGURE 2) forming an evaporator-economizer section, a superheater section, and a reheater section. Each of the steam generator modules is surrounded by a cylindrical wall 26 to confine and direct hot gas, as it leaves the reactor core, over the tubes of the various sections of the steam generator module. The size of the modules is determined in accordance with requirements of easy handling and mounting, and the requirement of its being small enough to pass through the access penetration 19 provided in the lower end wall 13 of the reactor vessel 11. Further details of the penetration will be explained subsequently. In addition to the foregoing requirements, considerations of the proper size for efficient operation is a further factor bearing upon the determination of the size of the steam generator modules. The total number of modules is dictated in accordance with the desired capacity of the power reactor and in accordance with the available space in the chamber 14.

In order to supply feed water to the steam generators and in order to remove steam therefrom for driving the turbines for electricity producing equipment, not shown, each steam generator module 18 is provided with its own reactor vessel penetration 27. Each of the penetrations 27 is provided with suitable containment structure and lining, indicated at 28, through which passes the various pipes necessary for carrying feed water and steam.

The access penetration 19 is provided centrally of the lower end wall 13 and communicates with the lower region 16. The containment means 21 are removably secured in the access penetration and are constructed to provide suitable containment for maintaining the integrity of the reactor vessel 11. The size of the penetration 19 is, naturally, as small as possible in order to not unduly weaken the reactor vessel and in order to not interfere with prestressing tendons extending through the lower end wall 13 of the reactor vessel 11. The size of the access penetration 19 is sufficient, however, to permit each steam generator module 18 to be passed therethrough. The steam generator modules are removably mounted in the lower region, being supported therein by suitable bolted flanges or similar means, not shown, in order that they may be readily removed for repair or replacement. Removal through the access penetration may be accomplished by handling equipment, not illustrated, which may be designed in accordance with known techniques to be capable of detaching and raising the steam generator module to be removed, shifting it over into alignment with the access penetration, and withdrawing it from the lower region through the access penetration. It may be necessary to remove other structural elements prior to removing a steam generator module, as in the case of the illustrated structure described in detail at a later point in this specification.

In order to circulate the coolant gas through the reactor, as subsequently described, a plurality of gas circulators or compressors 31 are provided. The coolant gas compressors 31 may be of any suitable type, but where helium is used as the coolant gas, it is preferred that the compressors each be a one or two-stage axial flow compressor directly driven by a single stage steam turbine passing the full reheat flow of the steam generator equipment. The latter type of compressor provides an inherent high efficiency, compactness and quiet and flexible operation. A purification system, not illustrated, may be provided for monitoring and removing contaminants from the coolant gas. The gas compressors 31 are located slightly closer to the walls of chamber 14 than the steam generator modules 18. A penetration 32 is provided for each of the gas compressors and each penetration includes a suitable containment structure, indicated at 33, for maintaining the integrity of the reactor vessel 11. Each of the containment structures 33 is designed to provide steam inlet and outlet passages for the steam drive of the associated gas compressor.

Figure 2:
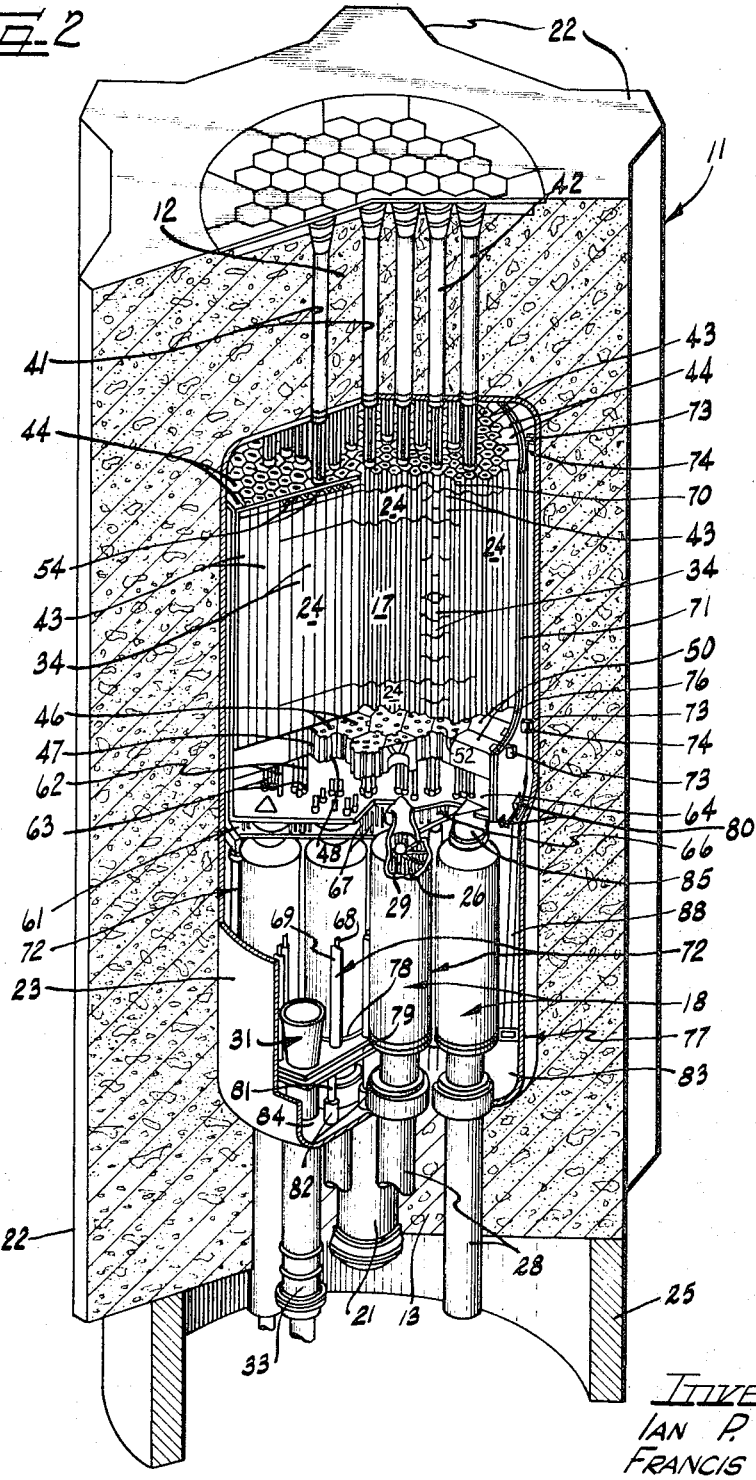
FIGURE 2 is a perspective view, with part broken away, of a nuclear reactor constructed in accordance with FIGURE 1.
Figure 3:
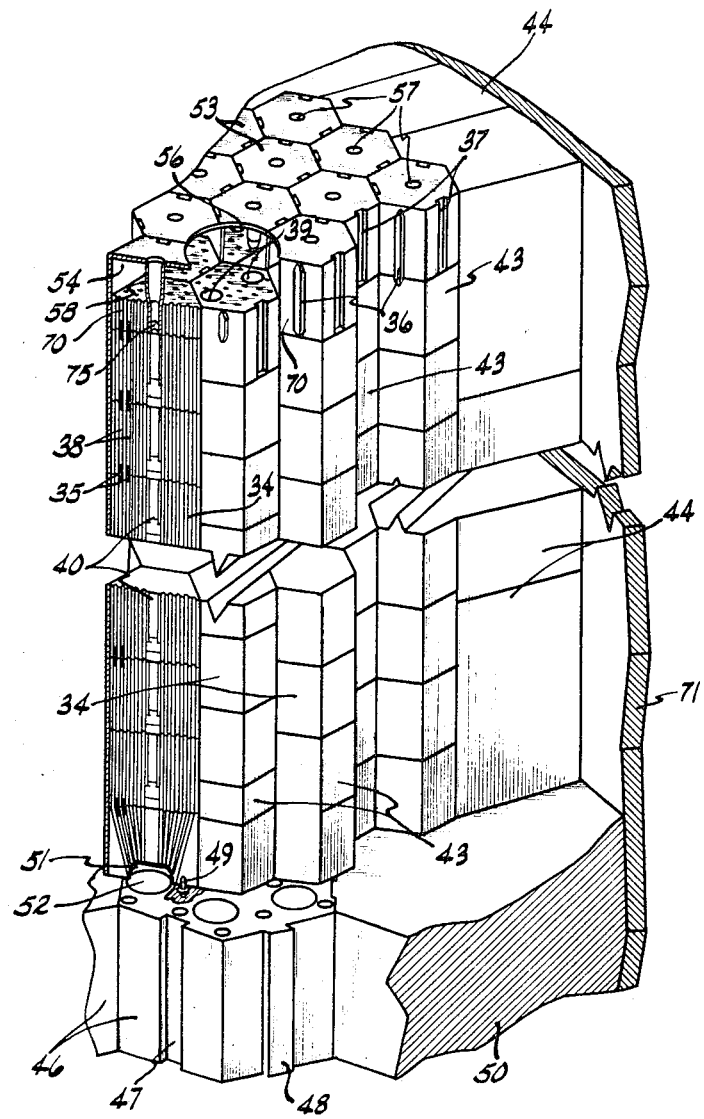
FIGURE 3 is an enlarged perspective fragmentary view of a portion of the reactor of FIGURE 2.

Although the specific construction of the core 17 and its associated support structure is not critical to the invention in its broadest form, the following specifically described structure has been found to provide certain advantages as to cost and operation and constitutes a preferred embodiment of the invention. Referring particularly to FIGURES 2 and 3, the specific construction of the core and its associated supporting structure may be more clearly seen. The general shape of the core is that of a right circular cylinder having a diameter which is slightly greater than its height. The core is made up of a plurality of columns of separate fuel blocks 34 of hexagonal cross section arranged on a uniform triangular pitch. The fuel blocks are preferably of pressed graphite construction in which a plurality of rods of fissionable material are imbedded. Each of the fuel blocks is provided with a plurality of vertical passages 38 therein. The passages 38 extend completely through the fuel blocks and are located in the same position in each of the fuel blocks such that the vertical passages extend completely through the length of each of the columns of fuel blocks. As will be explained subsequently, these vertical passages are utilized to pass coolant gas through the reactor core 17.

The fuel blocks 34 in some of the columns of the core 17 contain a pair of parallel vertical channels 39 therein in addition to the vertical passages 38. The channels 39 extend through the full length of these columns and permit control rods, not shown, to be lowered through the core. The drives for the control rods may be contained in penetrations 41 provided in the top end wall 12 of the reactor vessel 11. Suitable containment 42 is provided for these penetrations, and this containment may be removed to permit the same penetrations to be utilized for refuelling the reactor core. The columns of the fuel blocks 34 which contain the channels 39 are displaced axially downward relative to the other columns to eliminate the possibility of displacement of the fuel blocks 34 across the core at their interfaces. Alignment of the channels 39 and the passages 38 is maintained by a plurality of graphite dowel pins 35 (FIGURE 3) extending from the top face of each fuel block. The dowel pins on each fuel block fit into mating holes in the bottom of the block immediately above. The dowel pins may be hollow and coaxial with the coolant gas passages 38 to conserve space. The dowel pins are made of sufficient strength to withstand any credible horizontal inertial and fluid forces that may be imposed upon the fuel block columns. A hole 40 is provided centrally of each of the fuel blocks to permit insertion of a suitable refuelling handling tool, not illustrated.

As previously mentioned, the core 17 is surrounded by a reflector 24. The reflector consists of graphite blocks 43 identical in shape to the fuel blocks 34. The reflector blocks 43 are disposed in the same columnar arrangement as the fuel blocks, forming continuations of the fuel block columns in two layers above, and two layers below, the core 17. The reflector blocks in the top layer are provided with keys 36 and keyways 37 on alternate side faces. The keys and keyways interlock the blocks to each other to prevent relative movement. The reflector blocks include passages 38 forming continuations of the passages 38 in the fuel blocks. The height of some of the reflector blocks 43 is different from the others in order to compensate for the vertical offset of the fuel block columns having the channels 39. In addition, two rows of columns of the reflector blocks 43 surround the sides of the core.

The radially outermost portion of the reflector consists of a plurality of graphite reflector blocks 44, also arranged in columns. The reflector blocks 44 are substantially larger than the reflector blocks 43 and are shaped with two opposite angularly diverging sides, an arcuate side and an irregularly shaped side opposite the arcuate side. The irregular side of each reflector block 44 forms a mating engagement with adjacent columns of the reflector blocks 43, and the arcuate side forms part of an exterior cylindrical surface. This reflector configuration, of course, may be departed from, but the foregoing described configuration has been found satisfactory.

The reflector 24 further consists of a top layer of reflector blocks 70 over the columns of the fuel blocks 34. Each of the reflector blocks 70 has passages 38 therein and is provided with a metal cap 53. The metal caps 53 extend above the top of the reflector blocks 70 and form a hollow space above the upper ends of the coolant passages 38 for the fuel block columns. A circular opening 56 is defined by the metal caps above each of those columns containing the control rod channels 39. An orificing apparatus, not shown, is placed in each of the openings 56 to control the flow rate of coolant gas through the opening from the space above the core and reflector blocks. The vertical sides of the caps 53 are arranged so that the caps surrounding each of the openings 56 form a separate plenum 54 communicating with such opening. The outer columns of reflector elements 44 are not provided with caps but extend as solid blocks all the way to the top. Each of the caps 53 is provided with a central opening 57 therein, and a tube structure 58 communicates with such opening and with a fuel handling opening 75 to facilitate reception of a pickup tool for removing the capped reflector blocks 70 during refuelling.

The columns of fuel blocks and reflector blocks rest upon a layer of large hexagonal graphite core support blocks 46. As shown in the drawings, each support block 46 supports 7 columns of fuel blocks and reflector blocks. The support blocks 46 are provided with keyways 47 and keys 48 to provide interlocking engagement with each other. The columns of fuel and reflector blocks are positioned on the support blocks 46 by a plurality of graphite dowels 49 which provide lateral restraint and column alignment at the bottom of the core 17. As may be seen from FIGURE 3, the lowermost layer of reflector blocks 43 is designed such that the coolant passages 38 in each block converge into a collection chamber 51 formed in each block. Each of the support blocks 46 has a plurality of passages 52, each passage communicating with one of the chambers 51. Although not illustrated specifically in the drawings, each of the passages 52 in an individual support block 46 converges into a single outlet passage 55 (shown schematically in FIGURE 1) to pass the coolant gas through the layer of support blocks and discharge it below same. The layer of core support blocks 46 is radially surrounded and continued by a plurality of larger core support blocks 50. The core support blocks 50 are shaped to mate with the blocks 46 and to form a cylindrical outer surface. The blocks 50 support the side columns of reflector blocks 43 and 44.

The inter-keyed graphite core support blocks 46 and 50 are supported from a hollow core support floor 61 by a plurality of vertical graphite posts 62. The graphite posts have spherical ends to permit them to rock slightly to accommodate differential expansion between the parts of the structure. The top and bottom ends of the posts are located in spherical seats 63 provided in the bottom of the core support blocks and the top of the core support floor.

The core support floor 61 consists of an upper steel plate 64 and a lower steel plate 66. Because of the coolant flow, subsequently described, the plates 64 and 66 may be made of low alloy steel. A plurality of steel posts 67 extend between the upper and lower plates 64 and 66 to space same and to secure the plates to each other.

Lateral restraint of the core and reflectors is provided by a core barrel 71 comprising a steel cylinder extending from the top of the reflector 24 to below the core support floor 61. The core barrel and the core support floor 61 are supported on a plurality of support columns 72 extending vertically in the interspaces between the steam generators 18. Suitable keys, not shown, may be provided at spaces along the curved surfaces of the outer reflector elements 44 for keying the core and reflector radially to the core barrel in such a way as to permit relative expansion between the core and reflector and the barrel while still maintaining accurate location and lateral restraint of the core and reflector within the barrel. The outermost core support blocks 50 are also keyed, by keys 76, to the core barrel. The core barrel itself is radially keyed to the reactor vessel by keys 73 which extend into the space between projections 74, projecting radially inward from the walls of the liner 23 of the reactor vessel 11. The upper plate 64 of the core support floor 61 is suitably secured to the core barrel and is sealed thereto to inhibit gas leakage from the space above the core support floor to the outside of the core barrel.

The support columns 72, extending upwardly from a lower support floor 77, include a central spine 68 and an an outer sleeve 69 spaced therefrom to render the columns hollow. The lower support floor 77 is also hollow, consisting of an upper plate 78 and a lower plate 79. The spines 68 of the columns 72 extend through the lower floor and are attached to bundles 81 of flexible rods supported in suitable receptacles 82 attached to the reactor vessel liner 23 and supported on the lower end wall 13 of the reactor vessel 11. The bundles 81 allow for thermal expansion of the floor plates. The lower floor is spaced from the lower end of the chamber 14 and is sealed to the liner 23 to form a baffle for the coolant gas and to define a lower plenum 83 in which gas is collected before entering the compressors 31, as will be subsequently explained.

By the foregoing construction, all of the support structure within the core barrel 71 and all of the support structure below the core barrel and above the lower floor 77 is removable and replaceable. This means that removal of the steam generator modules 18 is possible for repair and replacement. In order to remove the steam generator modules 18, the reactor core 17 and reflector 24 are removed through the upper penetrations 41 by disassembling the individual blocks of which the core and reflector are comprised. The core support blocks 46 and the core support posts 62 are then removed in a similar manner. The core support floor 61 is then dismantled and removed, also through the upper penetrations 41. Dismantling may be accomplished either by cutting the floor apart if it is of welded construction, or by removing bolts if the floor is comprised of bolted sections. The hollow support columns 72 above the rod bundles 81 are then removed.

The containment structure 21 for the access penetration 19 may then be removed. A suitable central opening, not illustrated, is provided in the lower floor 77 and a closure therefor (also not illustrated), is removed through the access penetration 19. The steam generator modules 18, which are first uncoupled from the containment structure 23 and from the water and steam pipes extending therethrough, are then raised axially upward to clear the associated structure and the lower floor 77. The steam generator modules are then moved over into alignment with the access penetration 19 and are withdrawn therethrough. Upon replacement of a removed steam generator module, the foregoing described process may be reversed and the reactor internals reassembled for operation.

It is desirable to operate the reactor at relatively high temperatures in order to produce steam of high temperatures for operating modern steam turbine driven electrical generation apparatus. These high steam temperatures require a correspondingly high coolant gas temperature as it leaves the core 17, for example, almost 1500° F. Structural materials capable of supporting the weight of the core and reflector elements, steam generators, and associated apparatus at such temperatures are expensive and increase the cost of construction of the reactor significantly. Supplemental cooling is also expensive. Accordingly, it is desirable that the return flow of gas coolant be directed in such a way that the structural elements are cooled sufficiently to permit the use of lower cost structural materials. The flow pattern described subsequently is facilitated by the overall construction of the reactor as previously described and affords sufficient cooling to the structural elements of the reactor as to permit a substantial reduction in material cost.

Coolant gas collected in the space above the top of the reactor core 17 and its surrounding reflector 24 passes through the orifice opening 56 and into the plenums 54. The gas then enters the passages 38, flowing therethrough and into the chamber 51. As the gas flows through the passages 38 it is heated by the reactor core due to the heat generated by the fission chain reaction in the core. The hot gas is collected in the chamber 51 and then passed through the support blocks 46, through the passages 52 and 55 therein, and enters the space between the lower support blocks 46 and the core support floor 61. The cylinders 26 which sheath the tubes 29 of the steam generator modules 18 are maintained in fluid communication with the space above the floor 61 by ducts 85 which pass through the hollow space between the upper plate 64 and the lower plate 66 of the support floor 61. Thus the coolant gas passes through the ducts 85 and over the tubes of the steam generator modules 18.

The sheathing cylinders 26 of the steam generator modules communicate with the plenum 83 below the lower floor 77 and discharge the coolant gas thereinto after the gas is passed over the tubes of the steam generator modules. Each of the coolant compressors 31 is provided with an inlet opening 84 communicating with the plenum 83. The coolant gas is thereby drawn into the compressors 31 from the plenum 83. The plenum 83 is divided by a baffle 86 into two portions. In a satisfactory arrangement, there may be four gas compressors 31 provided, two of which communicate with each of the portions of the plenum 83 on either side of the baffle 86. In such an arrangement, it is preferable that half of the steam generator modules 18 discharge into each portion of the plenum 83.

The coolant gas, after being compressed, is discharged at high pressure into the space between the core support floor 61 and the lower floor 77. The lower plate 66 of the core support floor is provided with openings therein communicating with the space below the core support floor, and the coolant gas circulates through the space between the upper and lower plates of the core support floor. Openings 80 are provided in the core barrel 71 communicating from the space between the upper and lower plates of the core support floor 61 and the annular space between the core barrel 71 and the liner 23 of the reactor vessel. The gas discharged into this annular space circulates upwardly around the core barrel for cooling same and passes once again into the space above the top of the core 17 and its surrounding reflector 24. From here, the described circulation path is repeated.

In order to cool the support columns 72, each of the surrounding sleeves 69 provides communication between the space between the upper and lower plates 64 and 66, respectively, of the core support floor 61 and the space between the upper and lower plates 78 and 79, respectively, of the lower floor 77. Thus, a flow of coolant gas will occur downwardly in the interior of the sleeves 69 to discharge into the hollow lower floor 77. This cools each sleeve and the spine 68 which it surrounds. A plurality of ducts 88 are provided at spaced intervals around the outer edge of the lower floor 77. These ducts communicate between the hollow lower floor 77 and the annular space surrounding the core barrel 71. The spacing and orificing is arranged such that about 15 percent of the primary coolant passes downwardly through the hollow support columns 72, whereas about 80 percent of the total primary coolant flows through the core support floor 61. The other 5 percent is accounted for by leakage through various seals.

The described overall construction presents extended surface areas of the various structural elements to the coolant flow after the coolant has passed over the steam generators and hence is at its lowest temperature. Accordingly, the structural elements of the reactor are maintained at the lowest possible temperature for structural integrity without the use of supplemental cooling. By establishing a downward flow of coolant gas through the core, the blocks in each column of the core are urged downwardly against each other and the core support blocks on which they rest. This helps to maintain the relative positions of the blocks in the core. It may therefore be seen that the invention provides an improved nuclear reactor utilizing gas as the coolant and wherein the entire primary system is enclosed within a prestressed concrete reactor vessel. The reactor of the invention is capable of operating at relatively high temperatures and effects substantial cooling of the various structural elements in order to facilitate high temperature operation. The steam generator equipment is completely removable from the interior of the reactor vessel to facilitate replacement and repair.

Various modifications and other embodiments of the invention, in addition to those shown and described herein, will be apparent to those skilled in the art from the foregoing description and accompanying drawings. Such other embodiments and modifications are intended to fall within the scope of the appended claim.

What is claimed is:

A nuclear reactor comprising an elongated prestressed concrete reactor vessel including upper and lower end walls, said reactor vessel defining an elongated vertically oriented chamber with upper and lower regions, a plurality of steam generator modules removably supported in said lower region, a reactive core in said upper region supported by a core supporting means comprising a generally hollow core supporting floor extending transversely of said chamber between said upper and lower regions, coolant circulating means including a plurality of gas compressors located in said lower region, including a means for directing coolant through said compressors immediately after such coolant passes through said steam generator modules, coolant directing means comprising a lower floor extending transversely of said chamber in said lower region, said lower floor being spaced from said lower end wall to partially define at least one plenum and having openings for permitting coolant from said steam generator modules to pass therethrough, said compressors having intake openings communicating with said plenum, said core supporting floor having a plurality of ducts therein communicating between each of said steam generator modules and said upper region for passing coolant from said upper region to said steam generator modules, said core supporting means further comprising a plurality of columns extending between said core supporting floor and said lower floor and supporting said core supporting floor, wherein said compressors are positioned to discharge into the space between said lower floor and said core supporting floor for cooling said core supporting floor and said columns, said lower floor being hollow, said columns having coolant passages therein communicating between the interior of said hollow core supporting floor and the interior of said hollow lower floor, said coolant directing means further comprising means for directing coolant from the interior of said hollow core supporting floor and from the interior of said hollow lower floor to the top of said core and from the top of said core down through said core.

References Cited

UNITED STATES PATENTS 3,297,542   1/1967   Costes _____ 176—60

FOREIGN PATENTS 1,345,745   11/1963   France.
1,361,932   4/1964   France.
1,024,243   3/1966   Great Britain.
1,025,859   4/1966   Great Britain.

REUBEN EPSTEIN, *Primary Examiner.*